Jan. 4, 1938.　　　　A. CORBETT　　　　2,104,451
JUNCTION ADAPTER
Filed July 1, 1936　　　2 Sheets-Sheet 1
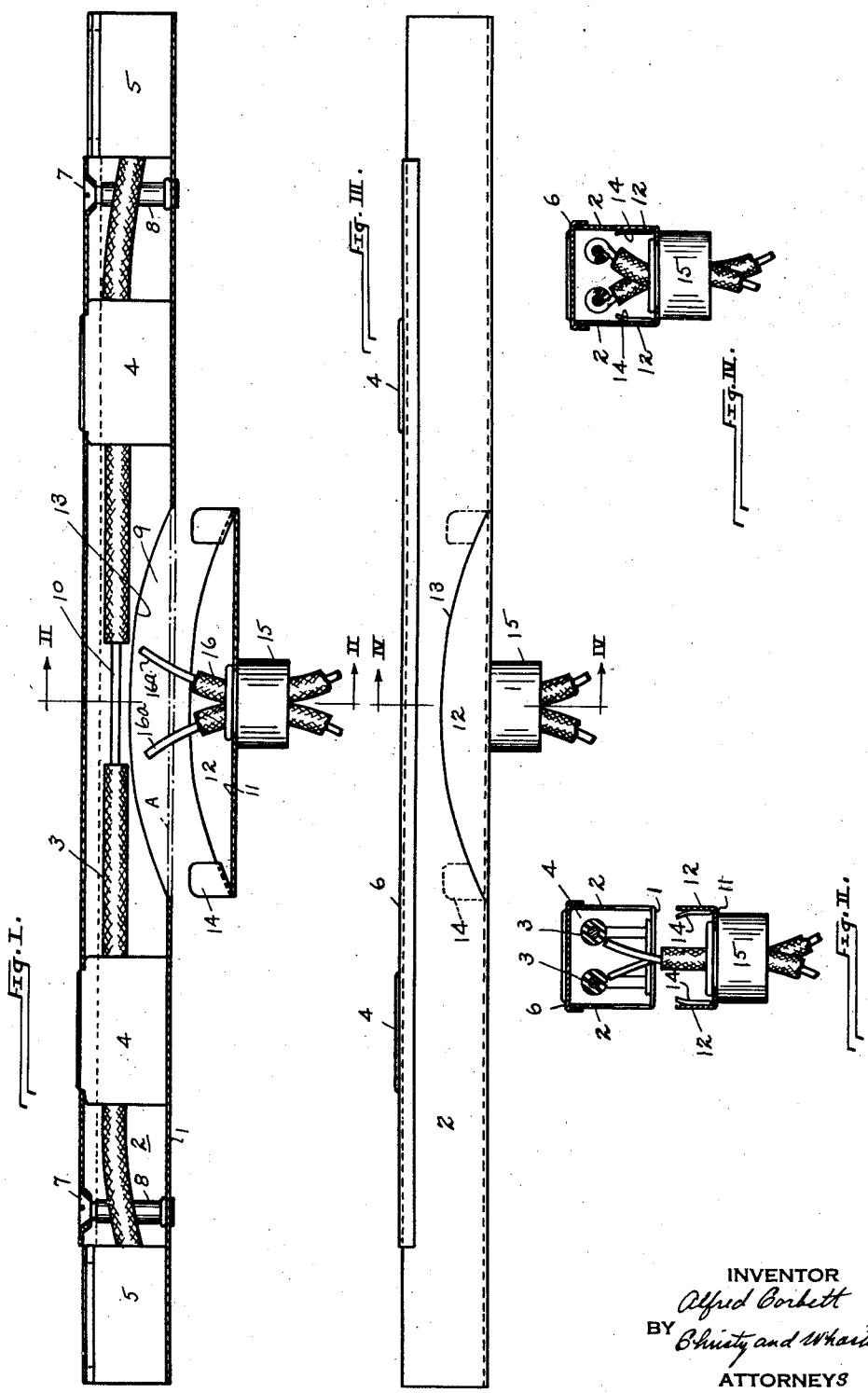
INVENTOR
Alfred Corbett
BY Christy and Wharton
ATTORNEYS Jan. 4, 1938.   A. CORBETT   2,104,451
JUNCTION ADAPTER
Filed July 1, 1936   2 Sheets-Sheet 2
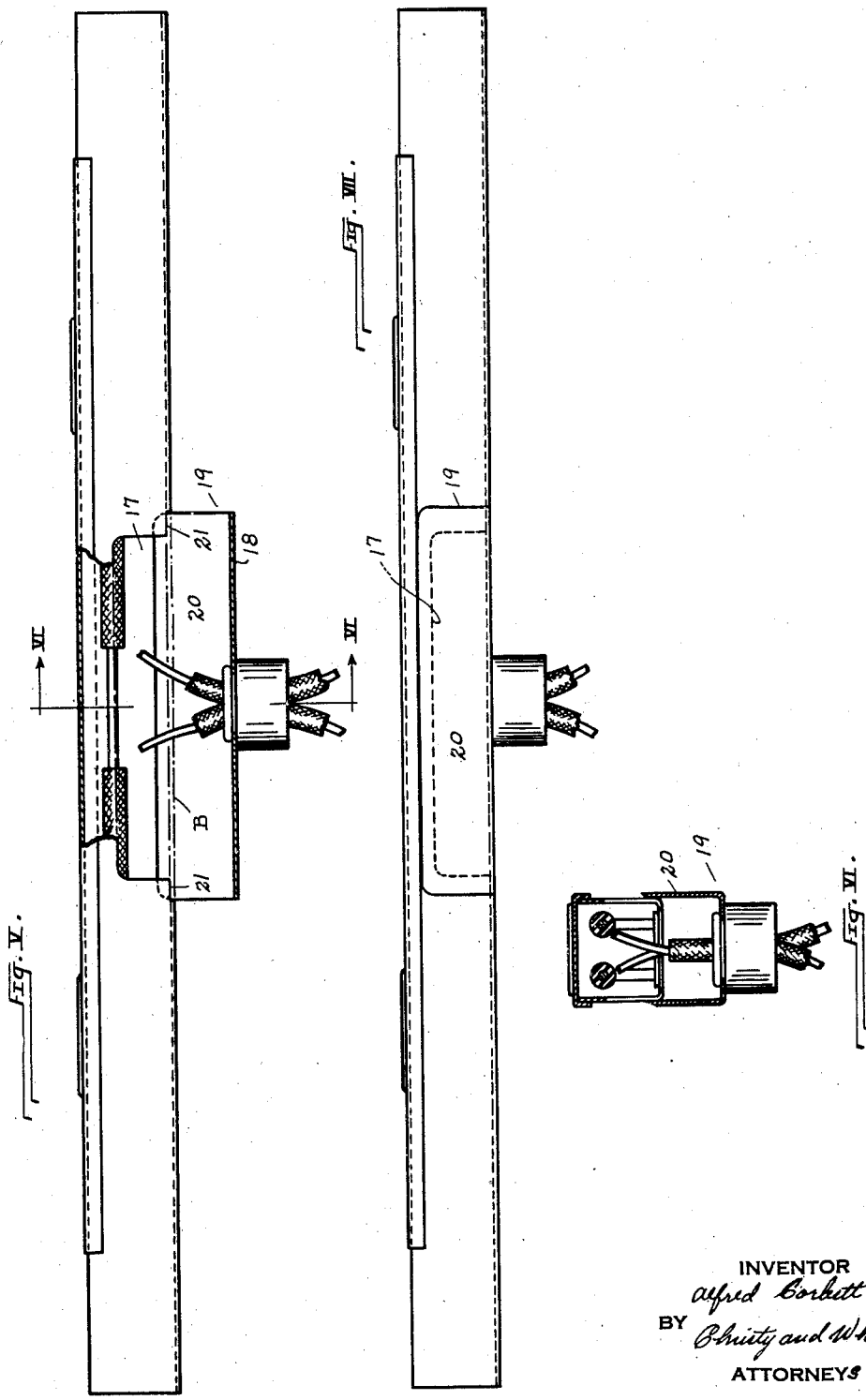
INVENTOR
Alfred Corbett
BY
Christy and Wharton
ATTORNEYS Patented Jan. 4, 1938

2,104,451

UNITED STATES PATENT OFFICE 2,104,451

JUNCTION ADAPTER

Alfred Corbett, Irwin, Pa., assignor to National Electric Products Corporation, a corporation of Delaware Application July 1, 1936, Serial No. 88,408

4 Claims. (Cl. 247—28)

This invention relates to a junction adapter associated with multiple outlet duct.

In manufacturing multiple outlet duct, it is made in a plurality of section lengths, which in installation are brought into end abutment with each other and are electrically interconnected either throughout the entire installation or throughout relatively extended lengths thereof. In manufacture it has been the practice to make certain of the duct sections as junction boxes at which electrical feed connection for the duct may be made. As a matter of increased convenience in installation, and particularly in anticipation of contingencies in which no specially formed junction sections may be immediately at hand, I have invented and developed a structural arrangement by which any number, or all, of the multiple outlet duct sections are potentially junction sections.

In the accompanying drawings Fig. I is a vertical, longitudinal, sectional view through a factory prepared section of multiple outlet duct, indicating in broken lines the region of the duct housing which has been cut or broken away to give access to the housing, and showing one form of my junction adapter in position for application to the duct housing for the making of electrical feed connection therein.

Fig. II is a cross-sectional view, taken in the plane of section line II—II, Fig. I, showing the electrical connection made between the feed wires and the conductor wires of the duct, but with the adapter still unconnected physically with the duct housing.

Fig. III is a side elevation of the structure shown in Fig. I, but showing the junction adapter applied to the duct housing, to close the opening therein, after electrical connection has been made between the feed wires attached to the adapter and the conductors embodied in the duct structure.

Fig. IV is a cross-sectional view taken on the plane of the section line IV—IV of Fig. III, showing the relative position of the structural elements, and of the connected conducting wires, when both electrical connection and physical assembly are complete.

Fig. V is a view similar to Fig. I, but showing a modified form of junction adapter, and a modification in the arrangement of the duct housing to which it is applied.

Fig. VI is a cross-sectional view, taken on the plane of the section line VI—VI of Fig. V, showing the electrical connection made between the feed wires and the conductor wires of the duct, but with the adapter still unconnected physically with the duct housing.

Fig. VII is a side elevation of the structure shown in Fig. V, but showing the junction adapter applied to the duct housing to close the opening therein after electrical connection has been made between the feed wires attached to the adapter and the conductors embodied in the duct structure.

Referring initially to the showing of Figs. I to IV, inclusive, of the drawings, reference numeral 1 designates the bottom of the channel housing of a section of multiple outlet duct, and reference numeral 2 designates the side walls of the duct. In the duct are a pair of longitudinally extended and laterally spaced conducting wires 3, which have electrical outlet connection at receptacle blocks, or sockets, 4, which are terminally connected in terminal blocks 5 adjacent the ends of the channel. A channel cover 6, perforate at intervals to provide electrical access to the sockets 4 is mounted on the channel of the duct and is secured thereto by means of screws 7 engaged in tubular interiorly threaded posts 8, which are secured to the base 1 of the channel to stand perpendicularly thereto.

In the interval between the sockets 4, the base 1 and side walls 2 of the channel are deleted in a region 9. The broken lines A indicate that this regional deletion may be provided for in the form of a knock-out in the factory-prepared and assembled duct structure, as well as being provided by cutting in the field. Adjacent the deleted region 9 of the channel, the conductor wires 3 are shown as stripped in a region 10 for electrical feed connection thereto.

The adapter structure for introducing feed wires to the duct is formed as a channel having a base 11 and side walls 12. It will be noted that these side walls 12 decrease progressively in height in both longitudinal directions from the transverse center line of the structure, thus having a curved edge contour which matches the curved edges 13 in the channel side walls 2 formed by deletion thereof in the region 9. Vertically upstanding and laterally inset tangs 14 are provided adjacent the ends of the adapter channel, by means of which the adapter may be attached to the duct channel in the matching position shown in Fig. II of the drawings. A coupling 15 for the attachment of feed wires is set in the base 11 of the adapter.

Referring particularly to Fig. I of the drawings, feed wires are drawn through the coupling 15 of the adapter. If the feed wires are organized with the woven protective covering known as "loom" in correspondence with the showing of the feed conductors 16 in the drawings, or if they be loose within a flexible metallic armor, the wires may be drawn through the coupling of the adapter any desired distance which may offer convenience in making electrical feed connection to the conductors within the duct. If the feed wires are integrated with the armor of a flexible cable engaged at the coupling a lesser length of wire is available for the feed connection.

The indicated region of the base 1, and side walls of the duct housing having been cut or knocked out to give the opening of predetermined form and dimensions at the region 9, the bared terminals 16a of the feed wires 16 are introduced therethrough and clinched to the bared regions 10 of the housed conductor wires 3. In making good electrical connection within the duct, the deleted region of the duct housing provides space for interconnecting the wires, and for suitably insulating the joints, as by wrapping insulating tape around them. If the feed wires be free, as shown, they are then pushed outwardly through the coupling 15 and clamped in the coupling, and the adapter is brought into position engaging the duct housing. If the conducting wires be integrated with a flexible armor, the slight excess length of the wires is accommodated in the coupling.

In physical assembly of the junction adapter with the duct housing, the side walls 12 of the adapter are brought into edge-matching position with respect to the curved edges 13 of the housing side walls 2. In this matching position of the elements, the tangs 14, being resilient, pass behind and engage the housing side walls lying above the deleted region thereof now occupied by the side walls 12 of the adapter. In assembly the base of the adapter thus lies flush with the base of the duct, without any regionally added thickness of metal to prevent the true setting of the assembly in mounted position.

The general organization shown in Figs. V, VI, and VII of the drawings is the same as that shown in Figs. I to IV, inclusive, of the drawings, but is modified as to the specific form of the adapter and the manner of its engagement with the duct housing. In these figures of the drawings the region 17 in the housing side walls deleted by cutting, or by removal of a knock-out indicated by broken lines B, is approximately rectangular, thus increasing the area within the duct which is made accessible for the insertion of fingers or tools in the making and insulation of electrical connection.

The adapter is similarly in the form of a channel, and its base 18 and coupling 19 may be identical with similar elements of the adapter shown in the preceding figures of the drawings. The side walls 20 of the adapter are, however, so dimensioned that in assembly they may overlap the housing side walls marginally of the deleted regions thereof both above and beyond the ends of the deleted regions.

Electrical connection is made identically as above described with reference to Figs. I to IV inclusive. Physical attachment of the adapter is also similarly made, save that the side walls 20 of the adapter channel by their own resiliency make snap engagement with the housing element of the duct section. In order that the effectiveness of such engagement be increased, the walls of the adapter channel may desirably be inclined very slightly toward each other.

In order that the base 18 of the adapter may lie flush with the base of the duct, the opening in the duct base is extended slightly beyond the main side wall openings so that its length equals the length of the adapter base. The side walls being provided with shallow corresponding notches 21, the base of the adapter occupies the space which normally would be occupied by the thickness of the duct base, and the base of the assembly is without surface irregularity.

In either of its illustrated forms, and in the various forms in which it may be made by way of modification, my junction adapter presents dual advantage. Thus, it permits the various sections of a multiple outlet duct equipment each to be made at will a junction box, and its use also provides for such structure of the duct sections themselves that working accessibility is provided for making and insulating the feed connection within the duct housing.

I claim as my invention:

1. The combination of a multiple outlet duct comprising a housing containing longitudinally extended electrical conductors and mounting and longitudinally spaced socket elements therefor and which housing is formed primarily as an elongate metallic channel having a base and side walls formed in one piece and a removable cover element therefor with a junction adapter formed as a metallic channel having a base provided with means for the through-passage and engagement of feed wires for connection to the conductors in the duct housing, and walls formed resiliently to engage the duct channel; the side walls and base of the duct channel being deleted in the region of the connection to provide an extended opening giving access to the interior of the channel between socket elements and providing clearance for manipulation of the feed wires in making electrical connection, and the base and walls of the adapter being formed in assembly to enclose the deleted regions of the channel.

2. The combination of a multiple outlet duct comprising a housing containing longitudinally extended electrical conductors and mounting and longitudinally spaced socket elements therefor and which housing is formed primarily as an elongate metallic channel having a base and side walls formed in one piece and a removable cover element therefor, with a junction adapter formed as a metallic channel having a base provided with means for the through-passage and engagement of feed wires for connection to the conductors in the duct housing, and walls formed resiliently to engage the duct channel the side walls and base of the housing channel being deleted in the region of the connection to provide an extended opening giving access to the interior of the channel between socket elements and providing clearance for manipulation of the feed wires in making electrical connection, the base and side walls of the adapter being formed in assembly to enclose the deleted region of the housing channel and the base and side walls of the channel being so prepared that in assembly the base of the junction adapter lies flush with the base of the duct.

3. The combination of a multiple outlet duct comprising a housing containing longitudinally extended electrical conductors and mounting and longitudinally spaced sockets therefor, which housing is formed primarily as an elongate metallic channel of rectangular cross section having a base and side wall formed in one-piece and a removable cover element therefor, with a junction adapter formed as a metallic channel of rectangular cross section having a base provided with means for the through passage and engagement of feed wires for connection to the conductors in the housing channel and walls formed and dimensioned resiliently to engage the duct channel; the side walls and base of the duct channel being deleted in the region of the connection to provide an extended opening giving access to the interior of the housing channel between socket elements therein and providing clearance for manipulation of the feed wires in making electrical connection, said region being dimensioned to be enclosed in assembly by the junction adapter with the channel side walls adjacent the said region marginally overlapped by the side walls of the adapter.

4. The combination of a multiple outlet duct comprising a housing containing longitudinally extended electrical conductors and mounting and longitudinally spaced sockets therefor, which housing is formed primarily as an elongate metallic channel of rectangular cross section having a base and side wall formed in one-piece and a removable cover element therefor, with a junction adapter formed as a metallic channel of rectangular cross section having a base provided with means for the through passage and engagement of feed wires for connection to the conductors in the housing channel; the side walls and base of the duct channel being deleted in the region of the connection to provide an extended opening giving access to the interior of the housing channel between socket elements therein and providing clearance for manipulation of the feed wires in making electrical connection, the deleted region of the channel base and the side walls of the channel element being equally shaped and dimensioned so that the side walls of the adapter channel fill the openings in the side walls of the housing channel the base of the adapter channel being arranged to close the opening in the base of the housing channel, and resilient members upstanding and slightly inset from the side walls of the junction adapter arranged resiliently to engage the junction adapter to the housing channel.

ALFRED CORBETT.